United States Patent
Lee (10) Patent No.: US 10,042,741 B2
(45) Date of Patent: Aug. 7, 2018

(54) DETERMINING A SUBSET OF TESTS

(75) Inventor: Vernon A. Lee, Mountain View, CA (US)

(73) Assignee: SYNOPSYS, INC., Mountain View, CA (US)

( * ) Notice: Subject to any disclaimer, the term of this patent is extended or adjusted under 35 U.S.C. 154(b) by 443 days.

(21) Appl. No.: 13/036,383

(22) Filed: Feb. 28, 2011

(65) Prior Publication Data

US 2012/0221283 A1    Aug. 30, 2012

(51) Int. Cl.
*G01R 27/28* (2006.01)
*G06F 11/36* (2006.01)

(52) U.S. Cl.
CPC .................. *G06F 11/3676* (2013.01)

(58) Field of Classification Search
CPC ................................. G06F 11/3676
USPC ........................................ 702/119
See application file for complete search history.

(56) References Cited

U.S. PATENT DOCUMENTS

| | | | | |
|---|---|---|---|---|
| 5,831,998 A * | 11/1998 | Ozmizrak | | 714/741 |
| 6,167,352 A * | 12/2000 | Kanevsky et al. | | 702/81 |
| 6,467,051 B1 * | 10/2002 | Browen et al. | | 714/30 |
| 6,983,216 B2 * | 1/2006 | Lam et al. | | 702/119 |
| 7,886,272 B1 * | 2/2011 | Episkopos et al. | | 717/124 |
| 2003/0051188 A1 * | 3/2003 | Patil | | 714/4 |
| 2006/0036392 A1 * | 2/2006 | Fay | | 702/119 |
| 2010/0235136 A1 * | 9/2010 | Bassett et al. | | 702/120 |

OTHER PUBLICATIONS

Harold, Mary Jean, "Regression Test Selection for Java Software", Nov. 1, 2001, ACM SIGPLAN Notices Newsletter, vol. 36 Issue 11, pp. 312-326.*

* cited by examiner

*Primary Examiner* — Stephanie Bloss
(74) *Attorney, Agent, or Firm* — Park, Vaughan, Fleming & Dowler LLP; Laxman Sahasrabuddhe (57) ABSTRACT

Methods and apparatuses are described for determining a small subset of tests that provides substantially the same coverage as the set of tests. During operation, a system (e.g., a computer system) can determine a set of tests by, for each object in a set of objects, selecting up to a pre-determined number of tests that provide test coverage for the object. Next, the system can determine a subset of tests by iteratively performing a loop, which can comprise: selecting a test in the set of tests; removing, from the set of objects, one or more objects that are covered by the selected test; and optionally removing, from the set of tests, one or more tests that do not cover any objects in the remaining set of objects. The system can terminate the loop after a termination condition is met and report the selected tests as the subset of tests.

22 Claims, 5 Drawing Sheets

DETERMINING A SUBSET OF TESTS

BACKGROUND

Technical Field

This disclosure generally relates to computing. More specifically, this disclosure relates to methods and apparatuses for determining a subset of tests or ranking tests, wherein each test provides test coverage for a set of objects.

Related Art

The importance of testing circuit designs cannot be overemphasized. Indeed, without proper testing it would have been impossible to design complicated integrated circuits which are commonly found in today's computing devices.

A circuit design can be tested by using a directed-test based simulation or by using a constrained random simulation. In a directed-test based simulation, the design is subjected to specific stimuli that are designed to test a particular aspect of the design. In a constrained random simulation, random vectors are generated to satisfy certain operating constraints of the design. These constraints are usually specified as part of a test-bench program. A test-bench automation tool (TBA) uses the test-bench program to generate random solutions for a set of random variables, such that a set of constraints over the set of random variables is satisfied. These random solutions can then be used to generate valid random stimuli for the Design Under Verification (DUV).

Regardless of whether the stimuli is generated for a directed-test simulation or for a constrained random simulation, the results of the simulation can then be examined to determine functional coverage, which provides a measure of confidence on the verification quality and completeness.

A DUV may be subjected to tens of thousands of tests, and each test may have different coverage, run times, memory requirements, etc. It is desirable to reduce the amount of time required to thoroughly test circuit designs.

SUMMARY

Some embodiments described in this disclosure provide methods and apparatuses for determining a small subset of tests that provides substantially the same coverage as the set of tests.

A design flow (e.g., a circuit design flow, a software design flow, etc.) may involve creating tens of thousands of tests to test objects in the design. An object can generally be anything that is desired to be tested. For example, for a circuit design, an object can be a block of code, a signal, a variable, a specific combination of value assignments to variables, user-defined cover groups, etc.

During operation, a system (e.g., a computer system) can determine a set of tests by, for each object in a set of objects and a pre-determined limit, selecting the set of tests that cover the object (i.e., provide test coverage for the object), but limiting the size of each set to the pre-determined limit. Next, the system can determine a subset of tests by iteratively performing a loop. Specifically, the system can begin the loop by selecting a test in the set of tests. In general, the system can select a test based on a variety of criteria or parameters. In some embodiments, the system can identify objects that are covered by only one test, and select such tests before selecting other tests. In some embodiments, the system can receive a list of (user-specified) pre-determined tests and select such tests before selecting other tests. In some embodiments, the system can select a test in the set of tests that covers the greatest number of objects in the set of objects. Once a test is selected, the system can then remove, from the set of objects, one or more objects that are covered by the selected test. Next, the system can optionally remove, from the set of tests, one or more tests that do not cover any objects in the remaining set of objects.

The system can then determine whether or not to terminate the loop. In some embodiments, the system can terminate the loop after a fixed number of iterations or after a second pre-determined number of tests have been selected. In some embodiments, the system can terminate the loop when the set of objects or the set of tests is empty. In some embodiments, the system can terminate the loop when the total cost, which can be determined by each test's run time or by other means, has reached a certain threshold, or when a pre-determined total coverage score has been reached by the selected tests combined, or when a certain amount of time (wall clock time) has passed, or when it is determined that no remaining unselected test can increase the overall coverage score by more than a pre-determined amount.

If the system determines to continue performing the loop, the system can select another test in the set of tests. On the other hand, if the system determines to terminate the loop, the system can report the tests that were selected during the iterations as the subset of tests.

In this disclosure, unless otherwise stated, the term "based on" means "based solely or partly on."

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Figure 1:
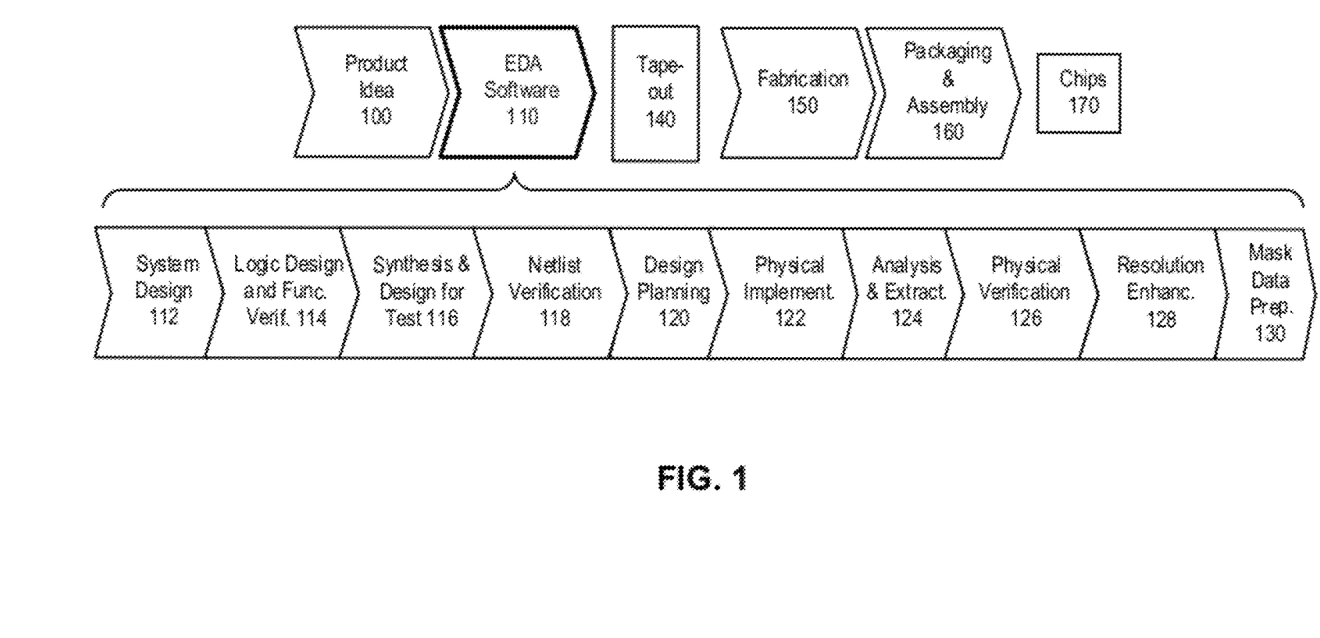
FIG. 1 illustrates various steps in the design and fabrication of an integrated circuit.

FIG. 1 illustrates various steps in the design and fabrication of an integrated circuit. The process can start with a product idea 100, which can be realized using Electronic Design Automation (EDA) software 110. Chips 170 can be produced from the finalized design by performing fabrication 150 and packaging and assembly 160.

A design flow that uses EDA software 110 is described below. Note that the design flow description is for illustration purposes only, and is not intended to limit the present invention. For example, an actual integrated circuit design may require a designer to perform the design flow steps in a different sequence than the sequence described below.

In the system design step 112, the designers can describe the functionality to implement. They can also perform what-if planning to refine the functionality and to check costs. Further, hardware-software architecture partitioning can occur at this step. In the logic design and functional verification step 114, a Hardware Description Language (HDL) design can be created and checked for functional accuracy.

In the synthesis and design step 116, the HDL code can be translated to a netlist, which can be optimized for the target technology. Further, tests can be designed and implemented to check the finished chips. In the netlist verification step 118, the netlist can be checked for compliance with timing constraints and for correspondence with the HDL code.

In the design planning step 120, an overall floor plan for the chip can be constructed and analyzed for timing and top-level routing. Next, in the physical implementation step 122, placement and routing can be performed.

In the analysis and extraction step 124, the circuit functionality can be verified at a transistor level. In the physical verification step 126, the design can be checked to correct any functional, manufacturing, electrical, or lithographic issues.

In the resolution enhancement step 128, geometric manipulations can be performed on the layout to improve manufacturability of the design. Finally, in the mask data preparation step 130, the design can be taped-out 140 for production of masks to produce chips 170.

Embodiments described in this disclosure can be used in one or more of the above-described steps. Specifically, some embodiments described in this disclosure can be used in the logic design and function verification step 114 and/or the netlist verification step 118.

Users may run tens of thousands of tests to verify their designs. Each test run may use different stimuli to attempt to cover different parts of the design (either directed or randomly generated stimuli). Different stimuli often produce overlapping or even wholly redundant coverage results. It is desirable to select the most effective tests, and optionally rank them in order of decreasing effectiveness, and discard redundant ones. Such graded test lists can then be used to shorten regression runs and also to select the best tests for gate-level simulation.

For example, it may be desirable to rank the tests based on certain criteria (e.g., functional coverage) and select a pre-determined number of tests based on the ranking. Conventional techniques for ranking tests are either very resource-intensive and take weeks or months to run over large input sets, or are relatively fast but produce poor results. Some embodiments described in this disclosure provide methods and apparatuses for ranking tests whose time complexity is linear in the size of the input and that produce results whose quality is close to the quality of the resource-intensive approaches.

Ranking tests by coverage effectiveness can be shown to be equivalent to the set cover problem, which is known to be NP-complete. Therefore, a polynomial-time optimal ranking process most likely does not exist. A conventional technique uses a greedy approach to iteratively select tests. If m is the number of objects to be covered, and n is the number of tests, then the time-complexity of the greedy approach is $O(mn^2)$ because the approach performs n iterations, and in each iteration the greedy approach checks coverage over all of the as-yet-uncovered objects for each of the as-yet-unselected tests. When the number of tests is large (e.g., in the tens of thousands), the run time for the greedy approach can be very long.

Figure 2:
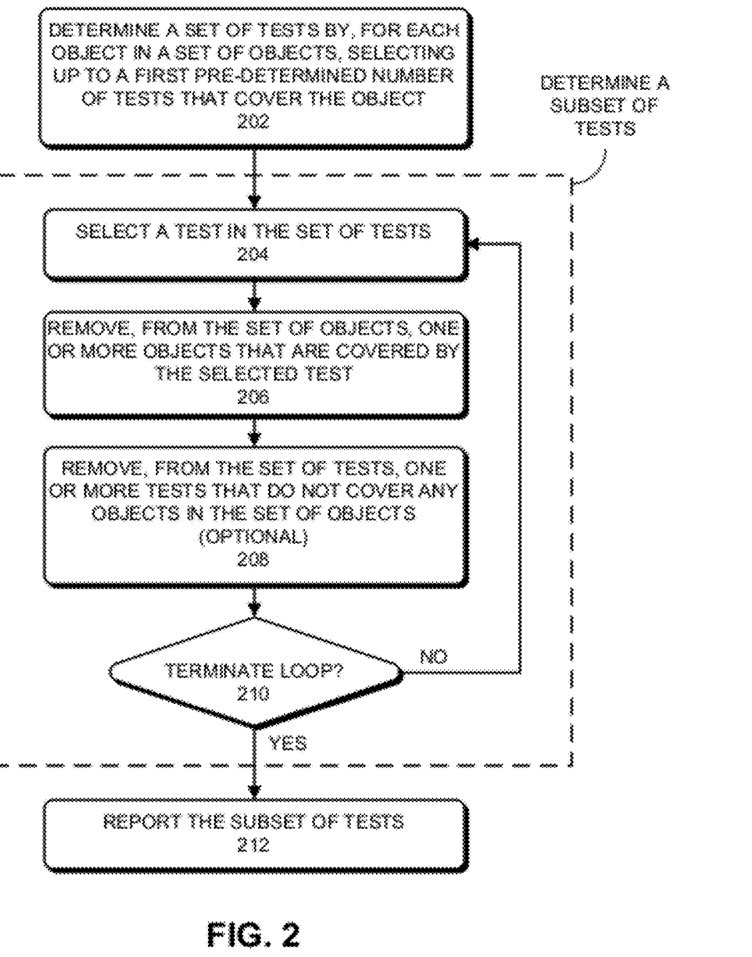
FIG. 2 presents a flowchart that illustrates a process for determining a subset of tests or ranking tests in accordance with some embodiments described in this disclosure.

FIG. 2 presents a flowchart that illustrates a process for determining a subset of tests or ranking tests in accordance with some embodiments described in this disclosure.

The process can begin with determining a set of tests by, for each object in a set of objects, selecting up to a first pre-determined number of tests that cover the object (operation 202). In some embodiments, for at least one object in the set of objects, the first pre-determined number is less than the total number of tests that cover the object. In some embodiments, the first pre-determined number of tests that are selected for a given object can be a function of the total number of tests that cover the object. In some embodiments, the function can be the ceiling of the logarithm to a given base. For example, if the total number of tests that cover an object is 1000, then the first pre-determined number can be $\lceil \log_2 1000 \rceil = 10$. In some embodiments, the first pre-determined number can be a constant.

In conventional techniques, in each iteration, all of the tests that cover an object are considered to determine a ranking or a subset of tests. In contrast, in some embodiments described in this disclosure, only up to a first pre-determined number of tests that cover an object are considered in each iteration. For example, suppose there are three objects A, B, and C, and 1000 tests T000-T999. Conventional approaches would consider all of the 1000 tests in each iteration to determine a subset of the tests. In contrast, some embodiments described in this disclosure may select a maximum of 10 tests per object, i.e., a total of at most 30 tests, and then consider this reduced number of tests in each iteration to determine a subset of the tests.

In some embodiments, the system can randomly select the first pre-determined number of tests from all of the tests that cover a given object. In other embodiments, the system can sort the tests that cover a given object based on some criteria, and then select the first pre-determined number of tests from the sorted list. For example, the system can lexicographically sort the tests based on their names, and select the first N tests from the sorted list.

Once the system determines the set of tests by selecting the pre-determined number of tests for each object, the system can determine a subset of tests by iteratively performing a loop. Specifically, the system can begin the loop by selecting a test in the set of tests (operation 204).

In general, the system can select a test based on variety of criteria or parameters. For example, in addition to specifying which objects a test covers, a test may also be associated with other parameters, such as the amount of memory required to run the test, the amount of time the test is expected to run, etc. In some embodiments, the system can determine a cost for each test based on the various parameters associated with the test. The system can then select the test that has the minimum or maximum cost.

In some embodiments, the system can select a test in the set of tests that covers the greatest number of objects in the set of objects. In some embodiments, the system can identify objects that are covered by only one test, and select such tests before selecting other tests.

Next, the system can remove, from the set of objects, one or more objects that are covered by the selected test (operation 206). The system can then optionally remove, from the set of tests, one or more tests that do not cover any objects in the set of objects (operation 208). Next, the system can determine whether or not to terminate the loop (operation 210).

In some embodiments, the system can terminate the loop after a fixed number of iterations, e.g., when a second pre-determined number of tests have been selected.

Note that, in each iteration, the system removes objects from the set of objects that are covered by the test that was selected in that iteration.

Therefore, the number of objects in the set of objects decreases in each iteration. In some embodiments, the system can terminate the loop when the set of objects is empty.

If the system determines to terminate the loop ("YES" branch), the system can report the subset of tests (operation 212). For example, the system can store the subset of tests in a computer-readable storage medium, or display the subset of tests to a user. On the other hand, if the system determines not to terminate the loop ("NO" branch), the system can return to operation 204 and select another test in the set of tests.

The process of determining a subset of tests can also be viewed as a process for ranking the tests. For example, the tests in the subset of tests can be considered to be ranked higher than the tests that are not in the subset of tests. In some embodiments, the tests can be assigned a rank based on the iteration in which the test was selected. For example, the first test that is selected to be in the subset of tests can be assigned the rank 1, the next test that is selected can be assigned the rank 2, and so forth. In general, any ranking process that operates on the entire set of tests can be adapted to generate a ranking based on the set of tests that is obtained after performing operation 202.

Various modifications to the disclosed embodiments will be readily apparent to those skilled in the art. For example, in one variation, the system may select multiple tests in each iteration. In another variation, the system may have multiple loops, with each loop selecting tests based on different sets of criteria. For example, in one variation, the system may have a first loop which selects tests based on whether or not the test is a singleton test (a singleton test is a test that covers an object that is covered by a single test). Once all singleton tests have been selected, the system may perform one or more additional loops which select tests based on test coverage, run time, memory requirement, or a combination thereof.

Figure 3:
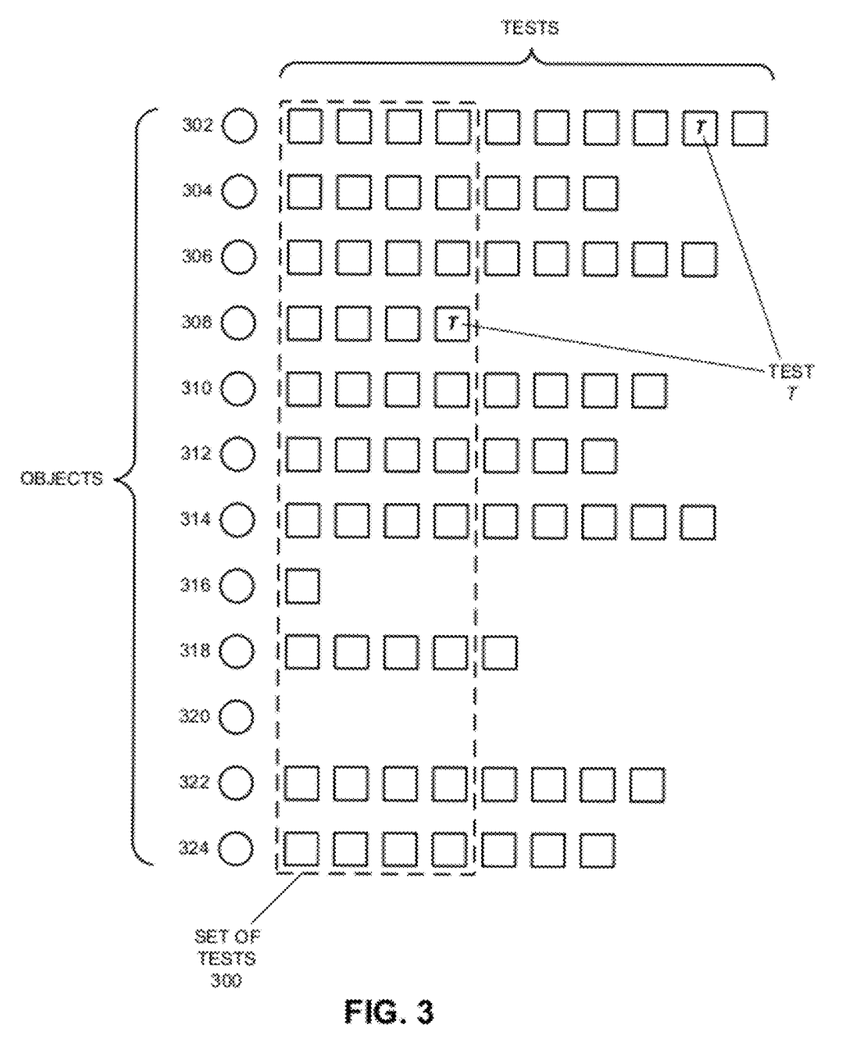
FIG. 3 illustrates the difference between using a pre-determined number of tests per object and using all of the tests in accordance with some embodiments described in this disclosure.

FIG. 3 illustrates the difference between using a pre-determined number of tests per object and using all of the tests in accordance with some embodiments described in this disclosure.

In FIG. 3, objects 302-324 are represented by circles and tests are represented by squares. An object can generally be anything that is desired to be tested. For example, an object can be a block of code, a signal, a variable, a specific set of variable assignments, user-defined cover groups, etc. The series of squares that are in the same row as an object represent the tests that cover that object. Note that the example shown in FIG. 3 may be small compared to situations that are typically encountered in real designs. A typical circuit design may easily have millions of objects and tens of thousands of tests.

In conventional approaches, all of the tests for each object are considered while ranking the tests. In contrast, in some embodiments described in this disclosure, only up to a pre-determined number of tests are selected for each object. For example, if the pre-determined number is equal to four, set of tests 300 would be used in some embodiments described in this disclosure as shown by the dashed rectangle in FIG. 3. Note that, although this approach only selects a pre-determined number of tests for each object, this approach does not ignore tests globally. Specifically, as shown in FIG. 3, test T was not within the pre-determined number of tests that were selected for object 302, but it was within the pre-determined number of tests that were selected for object 308.

Even though only a pre-determined number of tests are selected for each object, some embodiments described in this disclosure produce a ranking or a subset that is substantially of the same quality as an approach that uses all of the tests. This is because of at least the following insights: (1) there are often many objects that are covered only by a few tests, and none of that information is lost because these tests would be selected when the system selects up to a pre-determined number of tests for each object, and (2) other objects (i.e., those that are not covered only by a few tests) tend to be covered by most tests, and for such objects it doesn't really matter which test is selected because any test that is selected will most probably cover the object.

Figure 4A:
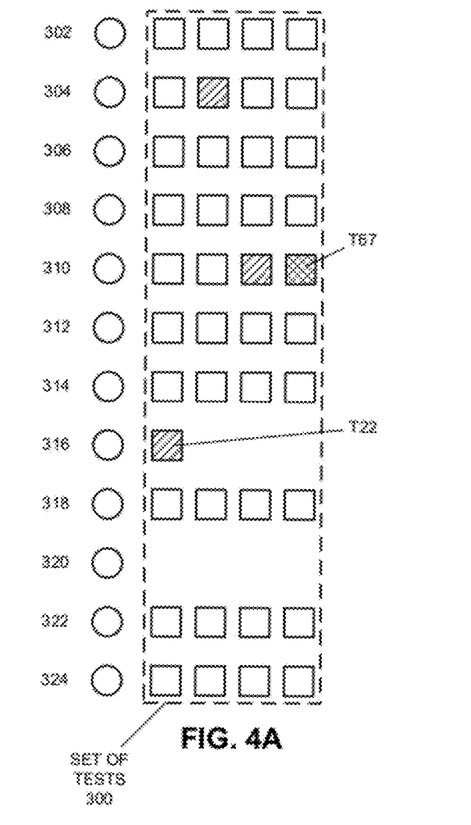
FIGS. 4A-4C illustrate an example of how a subset of tests can be determined in accordance with some embodiments described in this disclosure.
Figure 4B:
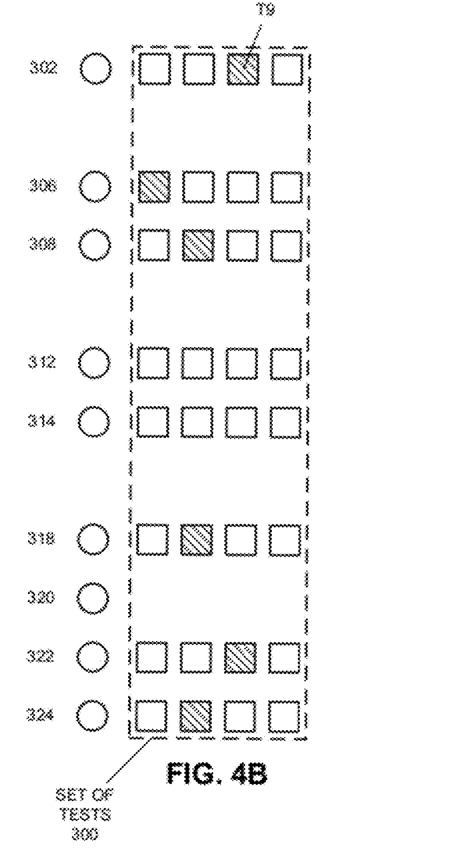
Figure 4C:
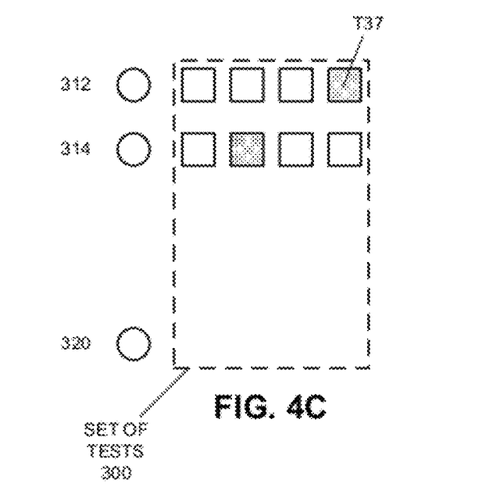

FIGS. 4A-4C illustrate an example of how a subset of tests can be determined in accordance with some embodiments described in this disclosure.

Let us assume that the system begins with the objects and tests as shown in FIG. 3. FIG. 4A illustrates the state after a pre-determined number of tests have been selected per object, e.g., after the tests that appear within the dashed rectangle in FIG. 3 are selected. FIG. 4A can correspond to the state after operation 202 in FIG. 2 is performed.

Next, the system may select a test from set of tests 300 (e.g., operation 204 in FIG. 2). Specifically, in some embodiments, the system can identify objects that are covered by a single test and select such singleton tests before selecting other tests. For example, as shown in FIG. 4A, the system may select test T22 that covers object 316 because object 316 is covered by a single test.

Next, the system can remove, from the set of objects, one or more objects that are covered by the selected test (e.g., operation 206 in FIG. 2). The system can then optionally remove, from set of tests 300, one or more tests that do not cover any objects in the set of objects (e.g., operation 208 in FIG. 2).

As shown in FIG. 4A, test T22 may cover objects 304, 310, and 316. Further, let us assume that test T67 only covers object 310 in set of tests 300. Note that test T67 may cover other objects, but such information can be lost when the system selects a pre-determined number of tests for each object.

FIG. 4B illustrates the state after the objects and tests are removed (e.g., after performing operations 206 and 208 in FIG. 2). Note that objects 304, 310, and 316 have been removed in FIG. 4B. Further, test T67, which only covered object 310, has also been removed from set of tests 300. The system can then continue to iterate until a termination condition is met (e.g., operation 210). In some embodiments, the system may not remove tests that do not cover any objects in the set of objects. Note that if the system selects the test that covers the greatest number of objects, then a test that does not cover any objects will not be selected.

In some embodiments, a system may first select all singleton tests before using other criteria to select tests. Specifically, in some embodiments, the system can select a test in set of tests 300 that covers the most number of objects. For example, as shown in FIG. 4B, the system may select test T9 because it covers six objects (objects 302, 306, 308, 318, 322, and 324) which may be the maximum number of objects covered by any test in set of tests 300. Next, the system can remove, from the set of objects, one or more objects that are covered by the selected test, and then optionally remove, from set of tests 300, one or more tests that do not cover any objects in the set of objects. The resulting state is shown in FIG. 4C.

The system may terminate the loop at this point if the loop was to be performed for a fixed number of iterations or after a pre-determined number of tests had been selected to be in the subset. Alternatively, the system may continue to perform the loop until the set of objects is empty or set of tests 300 is empty.

For example, in the next iteration, the system may identify test T37 as covering the most number of objects. Once the system selects test T37, removes objects that are covered by test T37 (objects 312 and 314), and removes tests that do not cover any objects, the set of tests may become empty. Note that the set of objects is not empty at this point because object 320 is not covered by any tests. At this point, the system may terminate the loop and report that the subset of tests contains tests T22, T9, and T37. Note that these three tests cover all of the objects except object 320. The system can then use these three tests to perform regression testing.

In another scenario (e.g., if object 320 did not exist in FIG. 3), the set of objects and the set of tests may become empty in the same iteration. In such cases, the system can terminate the loop when the set of objects becomes empty (e.g., after operation 206), instead of terminating the loop when the set of tests becomes empty (e.g., after operation 208).

These termination criteria have been described for illustration purposes only, and are not intended to limit the scope of the disclosed embodiments. Various modifications to the disclosed embodiments will be readily apparent to those skilled in the art. For example, the system can terminate the loop when the total cost, which can be determined by each test's run time or by other means, has reached a certain threshold, or when a pre-determined total coverage score has been reached by the selected tests combined, or when a certain amount of time (wall clock time) has passed, or when it is determined that no remaining unselected test can increase the overall coverage score by more than a predetermined amount.

Figure 5:
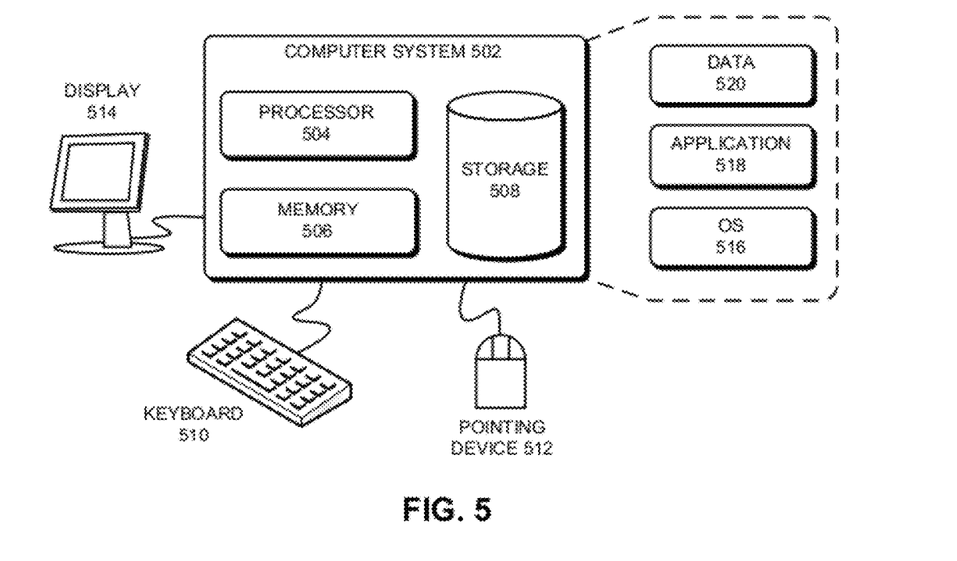
FIG. 5 illustrates a computer system in accordance with some embodiments described in this disclosure.

FIG. 5 illustrates a computer system in accordance with some embodiments described in this disclosure. A computer system can generally be any hardware apparatus that is capable of performing computations. Specifically, computer system 502 can include processor 504, memory 506, and storage device 508. Computer system 502 can be coupled to display device 514, keyboard 510, and pointing device 512. Storage device 508 can store operating system 516, application 518, and data 520. Data 520 can include constraints.

Computer system 502 may automatically perform any method that is implicitly or explicitly described in this disclosure. Specifically, during operation, computer system 502 can load application 518 into memory 506. In some embodiments, application 518 can perform the process illustrated in FIG. 2, or a variation thereof, to determine a subset of tests.

The above description has been provided in the context of determining a subset of tests that covers a given set of objects. In general, the above-described processes can be used to solve the set covering problem, or any problem that can be reduced to an instance of the set covering problem. Specifically, in a set covering problem, the input is a universe U and a family S of subsets of U. A cover is a subfamily C⊆S of subsets whose union is U. The goal in the set covering problem is to determine the smallest cover.

A mapping between the set covering problem and the test ranking processes described in this disclosure is as follows. Universe U can correspond to the set of objects that need to be tested. Each test can correspond to a subset of U because each test provides test coverage for a subset of the objects in U. In other words, each test can correspond to a member of family S. The subset of tests (e.g., the result of the iterative process illustrated in FIG. 2) can correspond to a subfamily C which covers all objects in U.

In the set covering problem, the goal is to determine the smallest subfamily C. Although the result of the iterative process illustrated in FIG. 2 may not always determine the smallest subfamily C, it is expected to determine, in many cases, a subfamily that is substantially the same size as the smallest subfamily.

CONCLUSION

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for testing a circuit design, the method comprising:
   receiving (1) a set of objects in the circuit design, (2) for each object in the set of objects, a set of tests that covers the object, and (3) coverage information that specifies which object in the circuit design is covered by which test;

wherein each object in the set of objects is (a) a block of code, (b) a signal, (c) a variable, (d) a specific combination of value assignments to variables, or (e) a user-defined cover group;

determining a first subset of tests based on the coverage information, wherein said determining the first subset of tests comprises, for each object in the set of objects,
selecting only a first pre-determined number of tests that cover the object when the cardinality of the set of tests that covers the object is greater than the first-predetermined number, and
selecting all tests that cover the object when the cardinality of the set of tests that covers the object is less than or equal to the first pre-determined number;

determining a second subset of tests by repeatedly performing a set of operations, comprising:
selecting a test in the set of tests, and
removing, from the set of objects, one or more objects that are covered by the selected test according to the coverage information;

testing the circuit design based on the second subset of tests; and providing the circuit design to a next step in a circuit design and manufacturing process which, when completed, produces an integrated circuit chip that contains the circuit design.

2. The method of claim 1, wherein the loop is terminated when a second pre-determined number of tests have been selected.

3. The method of claim 1, wherein the loop is terminated when the set of objects is empty.

4. The method of claim 1, wherein the loop further comprises removing, from the set of tests, one or more tests that do not cover any objects in the set of objects.

5. The method of claim 4, wherein the loop is terminated when the set of tests is empty.

6. The method of claim 1, wherein selecting a test in the set of tests involves selecting a test in the set of tests that covers the greatest number of objects in the set of objects.

7. The method of claim 1, wherein selecting a test in the set of tests involves:
identifying an object that is covered by only one test; and
selecting the test that covers the identified object.

8. The method of claim 1, wherein the first pre-determined number is a constant.

9. A non-transitory computer-readable storage medium storing instructions that, when executed by a computer, cause the computer to perform a method for testing a circuit design, the method comprising:
receiving (1) a set of objects in the circuit design, (2) for each object in the set of objects, a set of tests that covers the object, and (3) coverage information that specifies which object in the circuit design is covered by which test;
wherein each object in the set of objects is (a) a block of code, (b) a signal, (c) a variable, (d) a specific combination of value assignments to variables, or (e) a user-defined cover group;
determining a first subset of tests based on the coverage information, wherein said determining the first subset of tests comprises, for each object in the set of objects,
selecting only a first pre-determined number of tests that cover the object when the cardinality of the set of tests that covers the object is greater than the first-predetermined number, and
selecting all tests that cover the object when the cardinality of the set of tests that covers the object is less than or equal to the first pre-determined number;
determining a second subset of tests by repeatedly performing a set of operations, comprising:
selecting a test in the set of tests, and
removing, from the set of objects, one or more objects that are covered by the selected test according to the coverage information;
testing the circuit design based on the second subset of tests; and
providing the circuit design to a next step in a circuit design and manufacturing process which, when completed, produces an integrated circuit chip that contains the circuit design.

10. The non-transitory computer-readable storage medium of claim 9, wherein the loop is terminated when a second pre-determined number of tests have been selected.

11. The non-transitory computer-readable storage medium of claim 9, wherein the loop is terminated when the set of objects is empty.

12. The non-transitory computer-readable storage medium of claim 9, wherein the loop further comprises removing, from the set of tests, one or more tests that do not cover any objects in the set of objects.

13. The non-transitory computer-readable storage medium of claim 12, wherein the loop is terminated when the set of tests is empty.

14. The non-transitory computer-readable storage medium of claim 9, wherein selecting a test in the set of tests involves selecting a test in the set of tests that covers the greatest number of objects in the set of objects.

15. The non-transitory computer-readable storage medium of claim 9, wherein selecting a test in the set of tests involves:
identifying an object that is covered by only one test; and
selecting the test that covers the identified object.

16. The non-transitory computer-readable storage medium of claim 9, wherein the first pre-determined number is a constant.

17. A system, comprising:
a processor; and
a non-transitory computer-readable storage medium storing instructions that, when executed by the processor, cause the system to perform a method for testing a circuit design, the method comprising:
receiving (1) a set of objects in the circuit design, (2) for each object in the set of objects, a set of tests that cover the object, and (3) coverage information that specifies which object in the circuit design is covered by which test;
wherein each object in the set of objects is (a) a block of code, (b) a signal, (c) a variable, (d) a specific combination of value assignments to variables, or (e) a user-defined cover group;
determining a first subset of tests based on the coverage information, wherein said determining the first subset of tests comprises, for each object in the set of objects,
selecting only a first pre-determined number of tests that cover the object when the cardinality of the set of tests that covers the object is greater than the first-predetermined number, and selecting all tests that cover the object when the cardinality of the set of tests that covers the object is less than or equal to the first pre-determined number;

determining a second subset of tests by repeatedly performing a set of operations, comprising:

selecting a test in the set of tests, and removing, from the set of objects, one or more objects that are covered by the selected test according to the coverage information;

testing the circuit design based on the second subset of tests; and providing the circuit design to a next step in a circuit design and manufacturing process which, when completed, produces an integrated circuit chip that contains the circuit design.

18. The system of claim 17, wherein the loop further comprises removing, from the set of tests, one or more tests that do not cover any objects in the set of objects.

19. The system of claim 18, wherein the loop is terminated when one of the following conditions is met:

a second pre-determined number of tests have been selected;

the set of objects is empty; or the set of tests is empty.

20. The system of claim 17, wherein selecting a test in the set of tests involves selecting a test in the set of tests that covers the greatest number of objects in the set of objects.

21. The system of claim 17, wherein selecting a test in the set of tests involves:

identifying an object that is covered by only one test; and selecting the test that covers the identified object.

22. The system of claim 17, wherein the first pre-determined number is a constant.

* * * * *